United States Patent [19]

Kimura

[11] 4,425,976
[45] Jan. 17, 1984

[54] SMALL-TYPE FOUR-WHEEL AUTOMOBILE

[75] Inventor: Sukeaki Kimura, Hamamatsu, Japan

[73] Assignee: Suzuki Motor Company Limited, Japan

[21] Appl. No.: 279,700

[22] Filed: Jul. 2, 1981

[30] Foreign Application Priority Data

Nov. 28, 1980 [JP] Japan ................................. 55-166607
Jan. 10, 1981 [JP] Japan ................................. 56-1635
Jan. 10, 1981 [JP] Japan ................................. 56-1636
Jan. 28, 1981 [JP] Japan ................................. 56-10203

[51] Int. Cl.³ ............................................. B60K 5/04
[52] U.S. Cl. ........................................ 180/56; 74/475; 180/75; 192/96
[58] Field of Search .............. 180/297, 299, 298, 295, 180/56, 216, 63, 62, 215, 312, 75; 192/27, 70.29, 89 A, 56 R, 96, 109 A; 464/15; 188/18 R-18 A; 267/15 R, 57, 154; 74/470, 475, 371-372

[56] References Cited

U.S. PATENT DOCUMENTS

| 123,809 | 2/1872 | Coe | 188/18 R |
|---|---|---|---|
| 2,001,029 | 5/1935 | Kulick | 180/56 |
| 2,685,356 | 8/1954 | Bjerkan | 192/89 A |
| 2,751,992 | 6/1956 | Nallinger | 180/56 |
| 2,966,951 | 1/1961 | Lang | 180/56 |
| 3,011,796 | 12/1961 | Barenyi | 180/56 |
| 3,406,587 | 10/1968 | Brilando | 74/475 |
| 3,941,008 | 3/1976 | Cambria | 74/475 |
| 4,217,970 | 8/1980 | Chika | 180/298 |
| 4,271,942 | 6/1981 | Ballendux | 192/96 |
| 4,274,305 | 6/1981 | Roushdy | 74/470 |
| 4,297,909 | 12/1981 | Crouse | 74/470 |

FOREIGN PATENT DOCUMENTS

| 1048114 | 12/1953 | France | 180/63 |
|---|---|---|---|
| 1,483,387 | 4/1967 | France | 180/215 |

Primary Examiner—Joseph F. Peters, Jr.
Assistant Examiner—Timothy Roesch
Attorney, Agent, or Firm—McGlew and Tuttle

[57] ABSTRACT

A small-type four-wheel automobile, especially one adapted to carry one or two persons, has a generally U-shaped swing arm pivotally connected at ends of its branched arms to a chassis frame which supports front wheels, on this swing arm is mounted an engine unit which includes a power train, from an engine to an axle for rear wheels that serve as drive wheels, in a unitary construction.

9 Claims, 13 Drawing Figures

FIG. 8
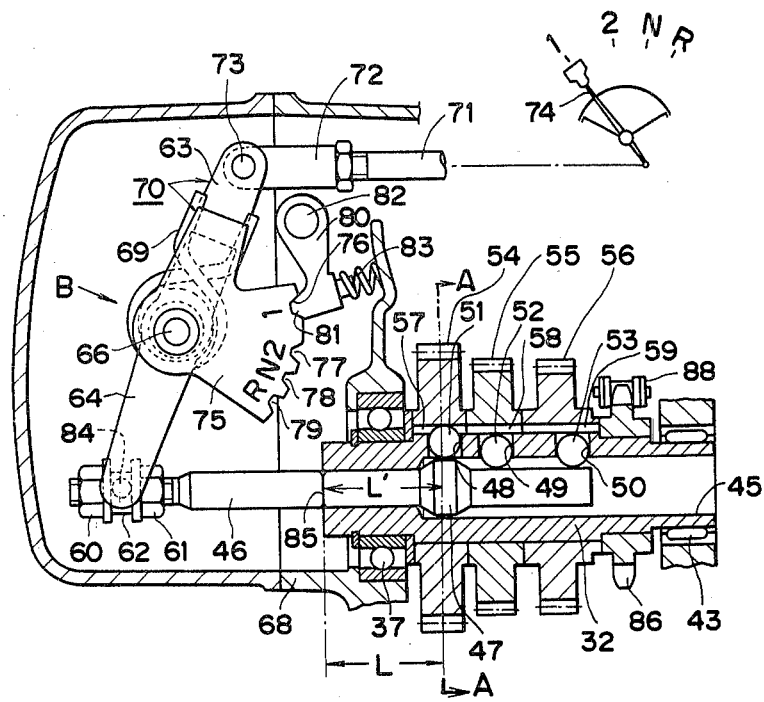
FIG. 9
FIG. 10
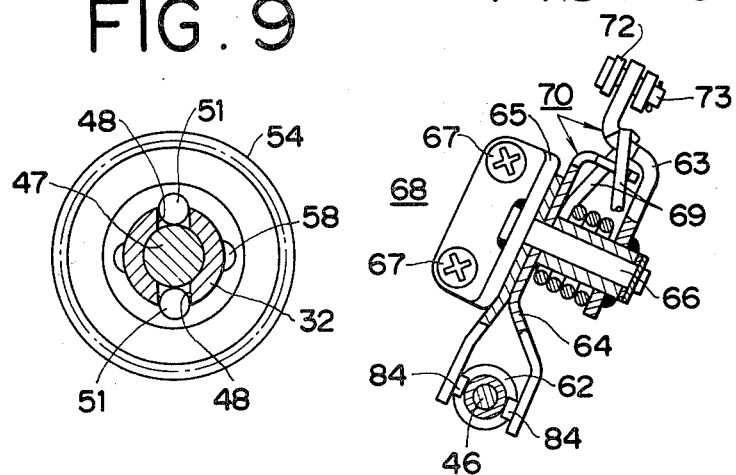

1

SMALL-TYPE FOUR-WHEEL AUTOMOBILE

FIELD AND BACKGROUND OF THE INVENTION

This invention relates to a small-type four-wheel automobile.

Four-wheel automobiles of small sizes, esepcially those which carry only one or two persons, are limited in engine power output, and therefore the most important problem for the manufacturers is to reduce the car weight to a minimum and whittle down the cost. In addition, the vehicles are required to provide riding comfort, have sufficient strength, and be easy to assemble, maintain, and inspect, like ordinary passenger cars.

In meeting these requirements the small cars are not beyond being improved in many points, e.g., in body frame configurations, engine design, mechanisms that connect the engine with the driving wheels, and in engine mounting on the chassis frame.

SUMMARY OF THE INVENTION

It is an object of the present invention to provide a four-wheel automobile which is small in size, light in weight, and available at low cost.

Another object of the invention is to provide a small-type four-wheel automobile which runs with a minimum of vibration.

Still another object is to provide a small-type four-wheel automobile with adequate strength.

Yet another object is to provide a small-type four-wheel automobile of a construction which is easy to assemble, maintain, and inspect.

Other objects and features of the invention will be apparent from a reading of the following description in conjunction with the accompanying drawings. In the drawings:

BRIEF DESCRIPTION OF THE DRAWINGS

FIG. 8 is an enlarged sectional view of the transmission in the power train;

FIG. 9 is a sectional view taken on the line A—A of FIG. 8;

FIG. 10 is a partly sectional view of the lever connections, as seen in the direction of the arrow B in FIG. 8;

DESCRIPTION OF THE PREFERRED EMBODIMENTS

Figure 1:
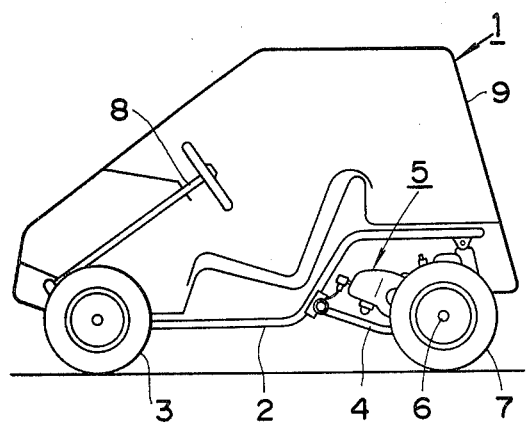
FIG. 1 is a schematic view, in vertical section, of a small-type four-wheel automobile embodying the invention.

Referring now to FIG. 1 there is shown a small-type four-wheel automobile 1 with a capacity of one person, as an embodiment of the present invention. This automobile 1 comprises a chassis frame 2 of pipes, a pair of front wheels 3 secured to both the front sides of the frame 2, a swing arm 4 of pipes pivotally connected at the front ends of its branched arms to intermediate portions of the frame 2, an engine unit 5 mounted on the swing arm 4, a pair of rear wheels 7 supported by a driving axle 6 which forms part of the engine unit 5, a steering wheel 8, and a car body 9 of synthetic resin material.

The engine 10 is formed integrally with a case 11, which in turn encloses the associated parts, from the transmission to the bearings of the driving axle 6. The engine 10, transmission, axle bearings, and case 11 combinedly constitute the engine unit 5.

The chassis frame 2 is bent midway, obliquely upward toward the rear and then bent back to extend horizontally. At about the middle point of the frame is provided a cross member 12. The swing arm 4 is generally U-shaped, with both its front ends rigidly attached to a rod 13 of a tubular structure. It is pivotally connected to the portions of the chassis frame 2 a short distance behind the cross member 12, through the rod 13 and brackets 14.

Figure 2:
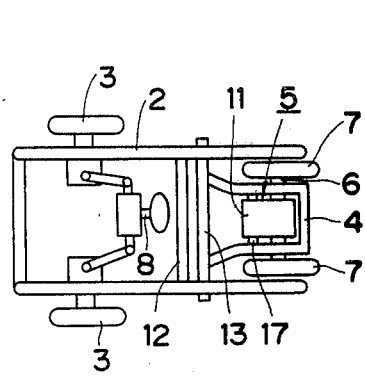
FIG. 2 is a schematic plan view of the automobile of the invention, with the car body eliminated to show the essential components.
Figure 3:
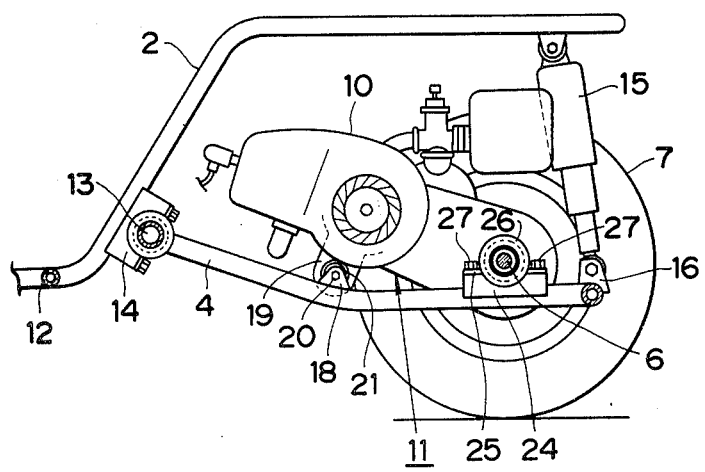
FIG. 3 is a fragmentary, enlarged sectional view of the rear part of the automobile according to the invention, showing how the engine unit is mounted.
Figure 4:
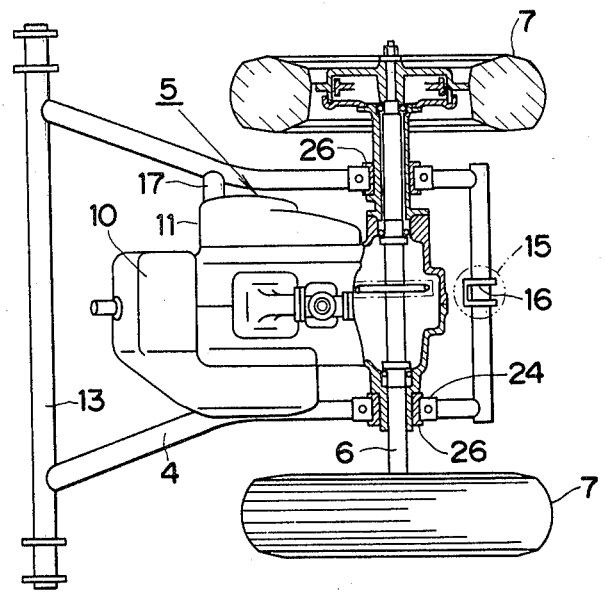
FIG. 4 is an enlarged plan view of the rear part of the automobile of the invention, with the rear-axle assembly and one of the rear wheels shown in section.

As shown in FIG. 4, the rod 13 is longer than the driving axle 6. Accordingly, the center-to-center distance, or tread, of the driving rear wheels 7 is narrower than the tread of the front wheels 3. (Refer to FIG. 2.)

Between the rear centers of the swing arm 4 and the chassis frame 2 is provided a shock absorber 15 with brackets 16 at both ends which act as support means for the swing arm.

Figure 6:
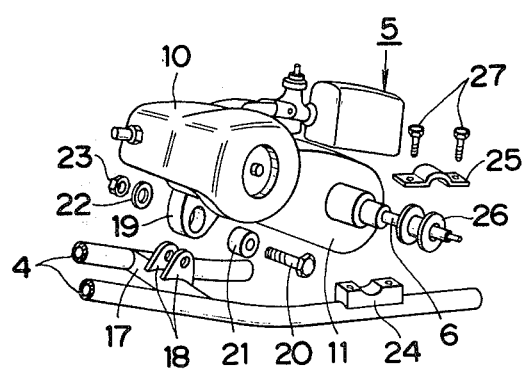
FIG. 6 is an exploded view of the swing arm and the engine unit.
Figure 5:
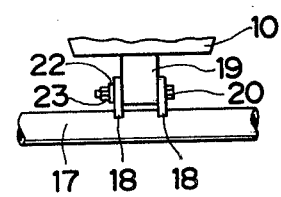
FIG. 5 is a fragmentary enlarged view of the swing arm carrying the engine unit, as seen from the front of the vehicle.

A rod 17 is extended across and secured at its ends to intermediate points of the two branched arms of the swing arm 4. To the middle portion of this rod 17 are secured, as shown in FIGS. 5 and 6, a pair of upright ears or brackets 18, which in turn receive therebetween a mounting bracket 19 protruding downward from a middle point of the under surface of the engine 10. With a bolt 20 inserted through holes of these brackets and fastened with a cushion 21, washer 22, and nut 23, the front part of the engine unit 5 is mounted on the swing arm 4. This forms first cushion mounting means On the rear portions of the branched arms of the swing arm 4 are secured rear axle brackets 24, which support the driving axle 6 at two points, each with a retainer 25, cushion 26, and bolts 27. In this way the rear part of the engine unit 5 is also mounted on the swing arm 4 by second cushion mounting means.

Figure 7:
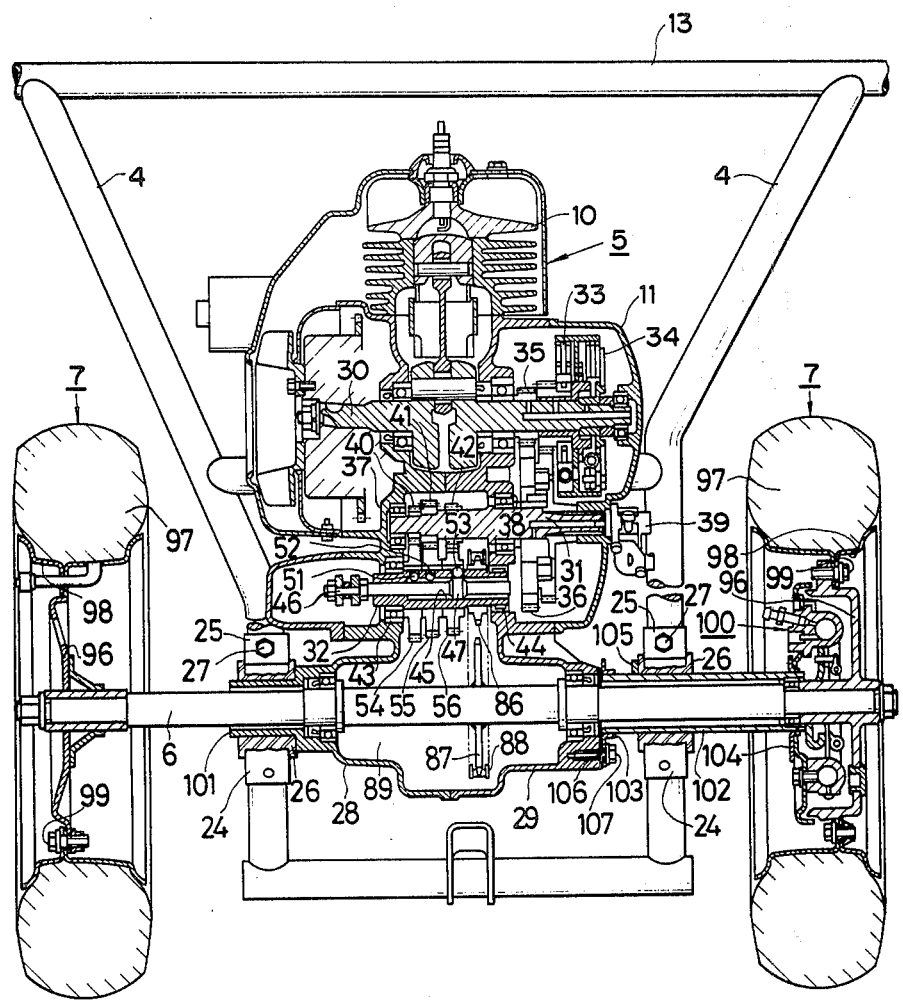
FIG. 7 is a sectional view of the engine unit with the power train.

As better shown in FIG. 7, the case 11 includes a left and a right shells 28, 29, which can be divided into two in the direction normal to the axis of the rear axle 6 (in the longitudinal direction as viewed in the figure). Inside the case 11 there are rotatably supported a crankshaft 30, countershaft 31, and drive shaft 32 of the engine 10, and the middle portion of the rear axle 6. The portion of the crankshaft 30 inside the shell 29 carries an automatic clutch 33 for the lower drive range and an automatic clutch 34 for the high range.

The crankshaft 30 and the countershaft 31 are operatively connected by gears 35, 36 in mesh, so that the rotary motion can be transmitted from the crankshaft 30 to the countershaft 31. The latter shaft is supported at one end and at a middle point by bearings 37, 38, and an oil pump 39 is attached to the other end. To a reduced-diameter portion of the countershaft 31 near the bearing are press fitted a gear 40 for the low range and a gear 41 for the drive range. Another gear 42 for reverse is provided adjacent the drive-range gear 41.

The driveshaft 32 is a hollow one supported by bearings 43, 44, and a shift rod 46 is inserted from the shell 28 into the center bore 45 of the shaft 32. The shift rod 46 has a bulge 47, which is adapted to engage any one of balls 51, 52, 53 (FIG. 8) formed in the drive shaft 32, so that the drive shaft 32 can be selectively coupled with one of change gears 54, 55, 56 loosely fitted on the drive shaft 32. When the driver causes the shift rod 46 to move forward or backward, the bulge 47 on the rod will force the ball 51, 52, or 53 radially outward into engagement with one of recesses 57, 58, or 59, respectively, formed in the gears 54, 55, and 56, thus operatively connecting the drive shaft 32 with one of the gears 54, 55, 56.

In FIG. 8, holes 48, 49, 50 are formed radially of the drive shaft 32, one each for the gears 54, 55, 56 they face, in such a manner that the single ball 51, 52, or 53 can couple the drive shaft 32 with the gear 54, 55, or 56. Alternatively, as shown in FIG. 9, the gear 54 (as well as the other gears 55 and 56) may have two holes 48 formed to receive two balls 51 instead of one.

On the front end portion of the rod 46 extended away from the drive shaft 32 is fitted a sleeve 62, which is adjustable in position by means of adjust nuts, 60, 61. The numeral 63 denotes a first lever and 64, a second lever. These two levers 63, 64 are turnably connected at one end, as in FIG. 10, to a pin 66 extending from a bracket 65, which in turn are secured to the inner wall surface of a gear case 68 by bolts 67. The levers 63, 64 are joined togehter by a coiled torsion spring 69 to maintain a normally straight relationship. Thus, given a force stronger than that of the torsion spring 69, the two levers 63, 64 would yield, naturally shifting their positions relative to each other. The levers 63, 64 and the torsion spring 69 constitute a lever unit 70.

At the other end of the first lever 63, a connector 72 attached to one end of a remote-control wire 71 is pivotally connected by a pin 73. The remote-control wire 71 transmits forces in the pushing direction as well as in the pulling direction. In this sense it acts like a rod. The opposite end of the wire 71 is connected to a shift lever 74 in the driving compartment. As indicated, the lever is operated to place the gears in the position marked with "1", "2", "N", or "R", and then a shift to the low driving range, high range, neutral, or reverse is completed.

A part of the first lever 63 is expanded to a sector form inwardly of the gear case 68, and the curved periphery of the sector has recesses 76, 77, 78, 79 formed to correspond to the number of gear positions to be shifted. One of these recesses 76, 77, 78, 79 is engaged with a pawl 81 formed at the free end of an arm 80. The arm 80 is supported at the other end by a pivot 82 and is normally kept in the engaged position under the urging of a spring 83. The sector 75 and the arm 80 constitute a positioner for the shift rod 46.

Turning to FIG. 10, the second lever 64 is shown bifurcated in the lower half, with lugs 84 attached to the inner sides and fitted in corresponding recesses of the sleeve 62.

As is clear from FIG. 8, the shift rod 46 has a marking 85 in the form of a light streak formed, e.g., by turning on a lathe. This marking 85 is provided at a distance L' from the center of the bulge 47 of the rod 46. The distance L' is chosen on the basis of the distance L between the center of the hole 48 for the ball 51 and the outer end of the drive shaft 32, in the relation L'=L or L'=L+ΔL.

The marking 85 serves as a guide when the shift rod 46 is to be inserted into the hollow drive shaft 32. In assembling these and associated component parts the operator can find the amount of the shift rod 46 inserted into the drive shaft 32 from the relative position of the marking 85 and the shaft end and then tighten the adjust nuts 60, 61 properly.

On the inner end portion of the drive shaft 32, which is close to the bearing 43, is press fitted a sprocket 86 as a speed reduction element on the driving side of a final reduction gear. An endless chain 88 is extended around this sprocket 86 and also around a sprocket 87 fixedly mounted on the axle 6 as a reduction element on the power output side. Since the sprocket 87 is aligned to the sprocket 86, there is provided a space 89 in the shell 28 of the case 11.

In the power train of the construction described above, the rotary motion of the crankshaft 30 is transmitted through either the automatic clutch 33 for the low drive range or the automatic clutch 34 for the high range to the countershaft 31. The motion is thence transmitted to the drive shaft via the low-range gear 40, drive-range gear 41, or reverse gear 42 attached to the countershaft 31 and further through one of the change gears 54, 55, 56 selected by means of the shift rod 46.

The operation of the transmission gear will now be explained. First, in the state shown in FIG. 8, the shift lever 74 rests in the low-range "1". The lever unit 70 and the shift rod 46 linked by the remote-control wire 71 maintain the angles and positions corresponding to the angle and position of the shift lever 74. Thus, the bulge 47 of the rod 46 is located inside the low-range gear 54, pushing the ball 51 radially outward to couple the drive shaft 32 and the gear 54 together.

Figure 11:
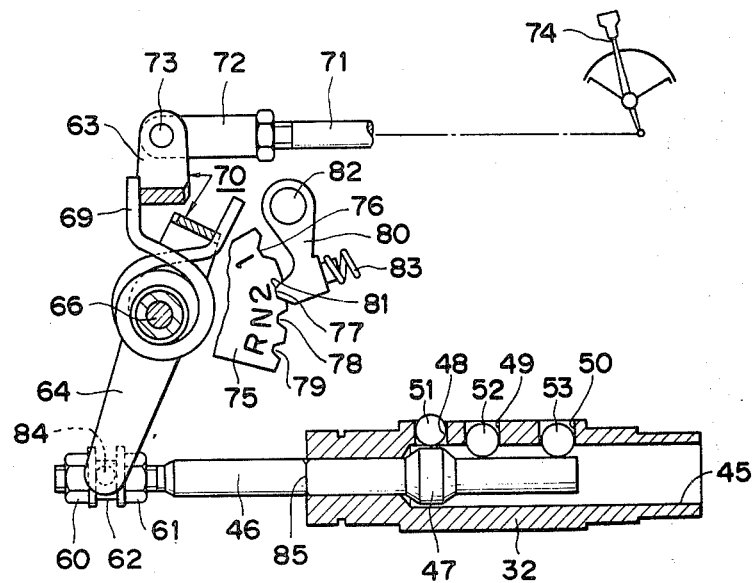
FIG. 11 is a partly sectional view of the arrangement of FIG. 8, illustrative of the power transmission between the levers.

Shifting from this to the high-range position "2" is accomplished in the following way. To begin with, the driver disengages the clutch (not shown). In case where the clutch is of an automatic type, he simply raises his foot off the accelerator pedal. Following either operation, the driver moves the shift lever 74 to the "2" position. This causes the first lever 63 to turn counterclockwise as viewed in FIG. 8, about the pivot 66. Accordingly, the pawl 81 is disengaged from the recess 76 into enagagement with the next recess 77, as shown better in FIG. 11. The second lever 64 too turns in the same direction as the first lever 63 by virtue of the torsion spring 69, pushing the rod 46 rightward as viewed in FIG. 8. This enables the bulge 47 to release the ball 51 but force the next ball 52 radially outward to couple the gear 55 with the drive shaft 32. The rotation of the drive shaft 32 is now carried to the axle 6 by way of the sprocket 86, endless chain 88, and sprocket 87.

Figure 13:
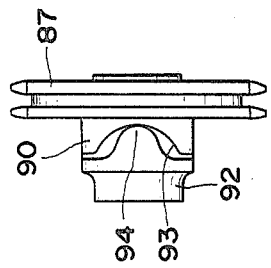
FIG. 13 shows a dog clutch between the final reduction element and the rear axle in FIG. 12 in mesh.
Figure 12:
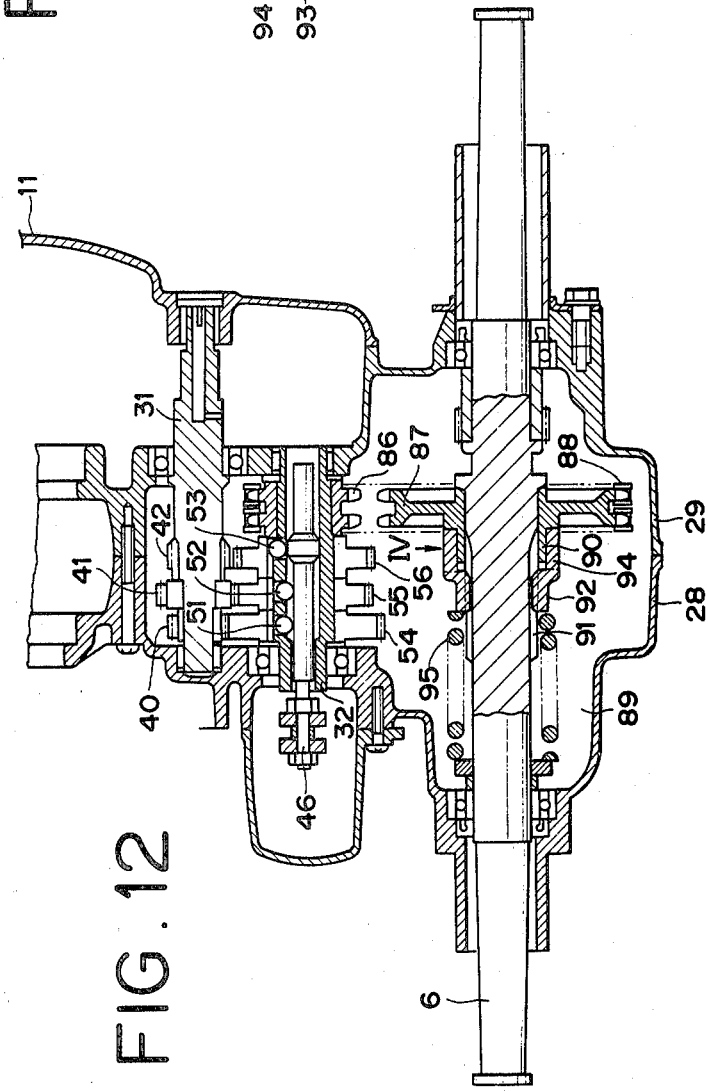
FIG. 12 is a sectional view of the power train mechanisms between the transmission and the rear axle.

Another embodiment of the final reduction gear for this power train will be described with reference to FIGS. 12 and 13. The sprocket 87 on the output side of the final reduction gear is loosely fitted on the axle 6 and carries a clutch member 90 on one side. Another clutch member 92 is fitted in splines 91 formed on the axle 6. These clutch members 90 and 92 are formed with recesses 93 and cam projections 94, respectively, so that the cam projections 94 formed on the clutch member 92 mesh with the recesses 93 of the clutch member 90. The clutch member 92 is normally urged by a spring 95, which is supported at one end by a portion of the axle 6, in the direction where the cam projections 94 remain fitted in the recesses 93. The clutch member 92 and the spring 95 are both accommodated in the space 89.

In the power train of the foregoing construction the rotation of the sprocket 87 driven by the endless chain 88 is carried to the axle 6 through the clutch member 92. Any impact which may result from the meshing of gears during the manipulation for a gear change can be absorbed because the clutch member 92 retracts, compressing the spring 95.

The two rear wheels 7 of the small-type four-wheel automobiles embodying the invention, as shown in FIG. 7, comprise wheel bodies 96 attached to the both ends of the axle 6, and tires 97 whose rims 98 are fastened to the wheels by bolts 99. These rear wheels 7 are driven by the axle 6 that receives the power from the engine by means of the sprocket 87 in the manner described, and therefore the both wheels 7 run together likewise at the same time. For this reason a brake 100 is provided for only one of the rear wheels, and naturally the axle bearing structures for the left and right portions of the axle 6 differ from each other.

The bearing structure on the left hand of the axle 6 as viewed in FIG. 7 comprises a tubular cushion 26 of rubber fitted in the recess of the already mentioned bracket 24, and a cylindrical portion 101 of the case 11 located in the cushion, through which the axle 6 extends leftward. On the other hand, the bearing structure on the right hand of the axle 6 as in FIG. 7 comprises a cushion 26 similar to the left one fitted in the recess of the bracket 24, and a metal sleeve 102 of iron located in the cushion.

The metal sleeve 102 has flanges 103, 104 welded to the both ends, and also has an upright lug 105 provided in the vicinity of the flange 103. The flange 103 has a hole 106, through which a bolt 107 is inserted to fasten the inner end of the sleeve 102 to the case 11. When the sleeve is so fastened the lug 105 contacts the inner end of the cushion 26 to keep it in position. The flange 104 at the outer end of the metal sleeve 102 supports the brake 100, which is of a conventional design and the description is omitted.

When the small vehicle of the construction described is running and is to be stopped, the brake 100 is applied. The braking force so exerted, in turn, produces a reaction force on the stationary side of the brake 100. This reaction force is transmitted through the metal sleeve 102 that supports the brake 100 to the case 11 and is taken up by the latter. In this case, the metal sleeve 102 of a tough material used will adequately receive and absorb the reaction force, despite the considerable distance between the case 11 and the rear wheel 7.

As will be obvious from the foregoing description of the embodiment, the small-type four-wheel automobile of the invention is made small in size and light in weight by the use of an engine unit that comprises the power train, from the engine to the rear axle that drives the wheels, in a unitary construction. In addition, the vehicle efficiently absorbs the vibrations that result from running on roads and also kills the vibrations of the engine itself by the cushions interposed between the engine unit and the swing arm.

The small four-wheel automobile according to the invention, with its engine unit mounted on the swing arm, does not require powerful shock absorbers of high damping forces but needs only one shock abosrber. This combines with the adoption of the chassis frame and swing arm of pipes to realize a further reduction of the overall weight.

The automobile according to the invention eliminates the universal joint and differential gear of the ordinary vehicles by narrowing the center-to-center distance, or tread, of the rear wheels as compared with that of the front wheels. The car weight is accordingly whittled down.

Also, in the automobile of the invention, the distance between the portions of the swing arm pivotally connected to the chassis frame is either equal to or greater than the center-to-center distance, or tread, of the rear wheels. The swing arm thus possesses sufficient torsional strength to withstand turning motions and enable the vehicle to make stable turns.

The automobile according to the present invention is easy to assemble, maintain, and inspect. This is because the case of the engine unit is partitioned in the direction normal to the axis of the axle, and the engine unit is housed in one of the case compartments, with the final reduction elements of the engine unit being accommodated in the deepest region of the compartment.

Furthermore, in the small-type four-wheel automobile of the invention, the final reduction elements are coupled to the rear axle by the clutch that is resiliently engaged by virtue of the spring, and the shift lever and the shift rod are coupled by way of the torsion spring. These arrangements prevent the transmission of excessive forces and thereby protect the compartment parts from damage.

What is claimed is:

1. A small four wheeled automobile comprising:
a chassis frame having a forward end and a rear end;
a pair of front wheels rotatably mounted to said chassis frame near its front end;
a U-shaped swing arm having a pair of branched arms with forward ends pivotally mounted to said chassis frame at an intermediate location thereon, said U-shaped swing arm including a rear cross portion;
support means connected between said chassis frame adjacent its rear end and said swing arm;
a cross rod connected between said pair of branched arms rearward of said forward ends thereof;
an engine unit having a pair of shells defining a space and containing an interconnected engine, transmission with drive shaft, axle bearings and axle, said drive shaft rotatably mounted between said pair of shells;
first cushion mounting means resiliently mounting a lower forward portion of said engine unit to said cross rod;
second cushion mounting means resiliently mounting a rearward lower portion of said engine unit to each of said branched arms and around said axle;
a rear wheel connected to each end of said axle, said axle being of a length so that a center to center distance between each rear wheel is less than a center to center distance between each of said front wheels and at most equal to a distance between pivotal mountings of said pair of branched arms to said chassis frame.

2. An automobile according to claim 1, wherein said support means comprises a single shock absorber connected between said rear portion of said U-shaped swing arm and said chassis frame adjacent the rear end thereof.

3. An automobile according to claim 1, wherein said engine unit includes final reduction elements connected to said drive shaft and axle respectively and engaged with each other disposed in a central rear location in said pair of shells.

4. An automobile according to claim 2, wherein said transmission is of the ball-lock type, said U-shaped swing arm and said chassis frame being made of pipes, said U-shaped swing arm including a pivot rod connected to said forward ends of said branched arms and pivotally mounted by brackets to said intermediate location of said chassis frame, a length of said pivot rod being greater than a center to center spacing of each rear wheel, said front wheels mounted on lateral outer sides of said chassis frame, said chassis frame having a substantially horizontal forward end forward of said intermediate location and a substantially horizontal rearward end with an upwardly extending intermediate end containing said intermediate location to which said U-shaped swing arm is pivotally mounted, said engine of said engine unit lying forward of said axle and over said first cushion mounting means.

5. An automobile according to claim 1, wherein said chassis frame is bent midway obliquely upward toward the rear and then bent back to extend horizontally.

6. An automobile according to claim 1, wherein said chassis frame and said swing arm are both built of pipes.

7. An automobile according to claim 1, which uses a ball-lock type transmission for said engine unit.

8. An automobile according to claim 3, wherein the final reduction element for the rear axle is loosely fitted on said axle in such a manner as to limit an axial sliding thereon, a dog clutch member provided on one side of said element, and another dog clutch member fitted on said axle slidably in the axial direction only, said latter clutch member being normally urged in contact with the former by a spring.

9. An automobile according to claim 7, wherein a driven lever for operating a shift rod of said ball-lock type transmission and a drive lever operatively coupled with a shift lever are loosely supported by a common pivot, and the both levers are connected together by a torsion spring.

* * * * *